US011603199B2

(12) United States Patent
Werner et al.

(10) Patent No.: US 11,603,199 B2
(45) Date of Patent: Mar. 14, 2023

(54) TAKE-OFF AND LANDING STATION

(71) Applicant: INNOTEC LIGHTWEIGHT ENGINEERING & POLYMER TECHNOLOGY GMBH, Goslar (DE)

(72) Inventors: Jens Werner, Wilsdruff STT Kesselsdorf (DE); Phil Pezus, Wilsdruff STT Kesselsdorf (DE); Matthias Bieler, Wilsdruff STT Kesselsdorf (DE); Florian Franke, Wilsdruff STT Kesselsdorf (DE)

(73) Assignee: INNOTECH LIGHTWEIGHT ENGINEERING & POLYMER TECHNOLOGY GMBH, Goslar (DE)

( * ) Notice: Subject to any disclaimer, the term of this patent is extended or adjusted under 35 U.S.C. 154(b) by 515 days.

(21) Appl. No.: 16/772,228

(22) PCT Filed: Dec. 13, 2018

(86) PCT No.: PCT/DE2018/101020
§ 371 (c)(1),
(2) Date: Jun. 12, 2020

(87) PCT Pub. No.: WO2019/114887
PCT Pub. Date: Jun. 20, 2019

(65) Prior Publication Data
US 2021/0070470 A1    Mar. 11, 2021

(30) Foreign Application Priority Data

Dec. 15, 2017 (DE) .......................... 102017130251.4
Dec. 15, 2017 (DE) .......................... 102017130252.2
(Continued)

(51) Int. Cl.
*B64C 39/02* (2006.01)
*B64F 1/30* (2006.01)
(Continued)

(52) U.S. Cl.
CPC ............ *B64C 39/024* (2013.01); *B60L 53/00* (2019.02); *B60L 53/16* (2019.02); *B60L 53/31* (2019.02);
(Continued)

(58) Field of Classification Search
CPC ....... B64C 39/024; B64C 29/00; B64C 27/00; B64C 17/04; B64C 2201/08;
(Continued)

(56) References Cited

U.S. PATENT DOCUMENTS 1,912,723 A    6/1933 Perkins
5,842,667 A    12/1998 Jones
(Continued)

FOREIGN PATENT DOCUMENTS

EP    3482618 A1    5/2019
WO    2013055265 A1    4/2013

OTHER PUBLICATIONS

U.S. Appl. No. 16/772,225, filed Jun. 12, 2020.
(Continued)

*Primary Examiner* — Behrang Badii
(74) *Attorney, Agent, or Firm* — Abel Schillinger, LLP

(57) ABSTRACT

Disclosed is a take-off and landing station (1) for a flying vehicle (2) for transporting people and/or loads, which flying vehicle takes off and lands vertically and comprises a flight module (3), having a plurality of drive units (17) arranged on a supporting framework structure (16) of the flight module (3), and a transportation module (4), which can be coupled to the flight module (3). The take-off and landing station (1) comprises a holding apparatus (21) having a plurality of gripper elements and support elements (11) for supporting, fixing and/or orienting the supporting framework structure (16) during take-off and landing of the flying vehicle (2) or the flight module (3).

20 Claims, 4 Drawing Sheets

(30) Foreign Application Priority Data

| Dec. 15, 2017 | (DE) | 102017130253.0 |
|---|---|---|
| Dec. 15, 2017 | (DE) | 102017130254.9 |
| Dec. 15, 2017 | (DE) | 102017130255.7 |

(51) Int. Cl.

| B64F 1/22 | (2006.01) |
|---|---|
| B60L 53/00 | (2019.01) |
| B64C 1/00 | (2006.01) |
| B64C 7/00 | (2006.01) |
| B64C 21/02 | (2006.01) |
| B64D 9/00 | (2006.01) |
| B64C 29/00 | (2006.01) |
| B64F 1/00 | (2006.01) |
| B60L 53/50 | (2019.01) |
| B60L 53/36 | (2019.01) |
| B60L 53/16 | (2019.01) |
| B60L 53/31 | (2019.01) |
| B64F 1/36 | (2017.01) |
| H02J 7/00 | (2006.01) |

(52) U.S. Cl.
CPC ............... *B60L 53/36* (2019.02); *B60L 53/50* (2019.02); *B64C 1/00* (2013.01); *B64C 7/00* (2013.01); *B64C 21/02* (2013.01); *B64C 29/0016* (2013.01); *B64D 9/00* (2013.01); *B64F 1/00* (2013.01); *B64F 1/22* (2013.01); *B64F 1/30* (2013.01); *B64F 1/362* (2013.01); *H02J 7/0013* (2013.01); *B60L 2200/10* (2013.01); *B64C 2001/0072* (2013.01); *B64C 2201/027* (2013.01); *B64C 2201/042* (2013.01); *B64C 2201/066* (2013.01); *B64C 2201/108* (2013.01); *B64C 2201/128* (2013.01); *B64C 2201/18* (2013.01)

(58) Field of Classification Search
CPC .......... B64C 2201/18; B64C 2201/128; B64C 2201/108; B64C 2201/066; B64C 2201/042; B64C 2201/027; B64C 2001/0072; B64C 29/0016; B64C 21/02; B64C 7/00; B64C 1/00; B64F 1/007; B64F 1/362; B64F 1/30; B64F 1/22; B64F 1/00; Y02T 90/14; Y02T 90/12; Y02T 50/80; Y02T 10/7072; Y02T 10/70; B60L 2200/10; B60L 53/50; B60L 53/36; B60L 53/31; B60L 53/16; B60L 53/00; H02J 7/0013; B64D 9/00
See application file for complete search history.

(56) References Cited

U.S. PATENT DOCUMENTS

| 9,505,493 | B2 | 11/2016 | Borko |
|---|---|---|---|
| 9,718,564 | B1 | 8/2017 | Beckman et al. |
| 2008/0111021 | A1 | 5/2008 | Toth et al. |
| 2009/0152391 | A1* | 6/2009 | McWhirk ................ B64B 1/70 |
| | | | 244/30 |
| 2016/0144982 | A1 | 5/2016 | Sugumaran |
| 2016/0200438 | A1 | 7/2016 | Bokeno et al. |
| 2016/0257424 | A1 | 9/2016 | Stabler et al. |
| 2016/0376031 | A1 | 12/2016 | Michalski et al. |
| 2018/0099748 | A1* | 4/2018 | Lesperance ............. B64D 1/22 |
| 2020/0055594 | A1* | 2/2020 | Tal ....................... B64C 29/0025 |
| 2020/0193847 | A1* | 6/2020 | Shannon ............... G08G 5/0026 |
| 2021/0269175 | A1* | 9/2021 | Tal ........................... B64F 1/364 |

OTHER PUBLICATIONS

U.S. Appl. No. 16/772,217, filed Jun. 12, 2020.
U.S. Appl. No. 16/772,213, filed Jun. 12, 2020.
U.S. Appl. No. 16/772,233, filed Jun. 12, 2020.

* cited by examiner

TAKE-OFF AND LANDING STATION

BACKGROUND OF THE INVENTION

1. Field of the Invention

The invention relates to a take-off and landing station for a flying vehicle which takes off and lands vertically for transporting people and/or loads.

2. Discussion of Background Information

Flying vehicles for transporting people and/or loads are becoming increasingly important because they enable rapid transportation in a manner largely independent of infrastructural facilities such as roads, railways, bridges, tunnels etc. In particular, this applies to smaller flying vehicles which can take off and land vertically and therefore do not require a runway.

Nonetheless, a ground station for take-off and landing has proved advantageous also for such types of flying vehicles. A system for the automatic take-off and landing of unmanned aircraft is known from WO 2013/055265 A1. The system has a ground station with means for communication with the aircraft, an assembly with a gripper arm for catching hold of and launching an aircraft, a computation unit for calculating a contact point between the gripper arm and aircraft and also a control unit, wherein the control unit is designed to control the gripper arm in such a way that an aircraft can be moved between a storage position and the contact point.

The system described, however, is only suitable for processing smaller, unmanned aircraft on the ground. In addition, only one aircraft, and this also only in its entirety, can be processed at the ground station in each case.

The object underlying the invention is therefore to specify a more efficient take-off and landing station for a flying vehicle that takes off and lands vertically, for people and/or loads. This take-off and landing station is also designed to enable a functionally reliable and non-hazardous take-off and landing process. It would also be desirable to incorporate a logistics system for managing modules of the flying vehicle.

This object is achieved by the subject matter of the independent claim. Advantageous further modifications of the invention are given in the dependent claims.

SUMMARY OF THE INVENTION

The take-off and landing station in accordance with the invention is specifically suitable for a modular flying vehicle, which takes off and lands vertically, for transporting people and/or loads. The flying vehicle, which has a flight module and a transportation module that can be coupled to the flight module, can both take off from and land in the take-off and landing station and also partially, or modularly (separated into modules), be temporarily stored in it.

The flight module has a main structure with several drive units arranged on the main structure.

The transportation module has a transportation capsule which serves to encase the people and/or loads to be transported, and in addition a connecting device for connecting the transportation capsule to the flight module.

The connecting device can be connected in a detachable manner to the transportation capsule, so that the transportation capsule can also be handled without the connecting device.

The connecting device may have an elongated shaft which at one end has a coupling device for connection to the flight module and at the other end attaches to the transportation capsule.

The shaft can be designed extended in such a way that vertical safety clearance of the coupling device is produced above the transportation capsule, so that corresponding safety clearance can be guaranteed between the transportation capsule and the flight module when they are coupled. The vertical safety clearance can correspond to the length of the shaft and is defined in such a way that an adult person using the transportation module cannot, from a standing position, touch the coupling device or the coupled flight module. The vertical safety clearance can—based on a usable transportation capsule height of for example 2 m—be at least 0.5 m, preferably 1.0 m and even more preferably 1.50 m.

The vertical safety clearance is selected in such a way that the safety risk to the people using the transportation module is minimised by e.g. contact of such a person with the attached flight module being avoided during use of the transportation module.

In accordance with the invention, the take-off and landing station has a holding apparatus with a plurality of gripper or support elements for supporting, fixing and/or orienting the main structure during the take-off and landing of the flying vehicle or of the flight module.

This holding apparatus guarantees stable, secure receiving and holding of a flying vehicle of the type described above or also of a flight module of the flying vehicle of the type described above, disconnected from the transportation module.

The holding apparatus may preferably be designed stationary with respect to the site or a building platform, wherein the gripper and support elements arranged on the holding apparatus receive the flying vehicle or the flight module at a safe distance above the site or platform level, hold it and—from an aeronautical perspective—optimally orient it for safe take-off or safe landing of the flying vehicle or the flight module in the take-off and landing station.

The compact design, which concentrates functions, of the inventive take-off and landing station thereby enables arrangement not only on the site ground but for example also on buildings, structures or other accessible objects, e.g. ships or floating platforms.

The holding apparatus with the gripper and support elements is in particular designed in such a way that the weight of the flying vehicle or the flight module can be supported even when the drive units/propellers are not operational.

The gripper and support elements are designed and arranged in such a way that damage to the flight module or flying vehicle can be safely avoided during take-off and landing.

Individual, or all of, the gripper and support elements may for example be designed in the form of stationary or moveable, one-part or multi-part gripper arms, in the manner of variable linear units or similar multi-axle, mechanical constructions (e.g. industrial robots).

Some or all of the gripper and support elements may for example be designed in the shape of a fork for supporting and partly enclosing, at the side, the girders of the main structure, which guarantees they are highly secured to prevent the support position of the flight module slipping to the side.

Some or all of the gripper and support elements may however also, for example, be designed in the shape of beams that allow the girders of the main structure to rest flat on them, which permits a higher tolerance of the support position of the flight module.

A plurality of gripper and support elements may for example form the basic shape of a ring-shaped or a hexagonal frame. The dimensions and the arrangement of the gripper and support elements may preferably be selected such that contact with the flight module occurs at certain support points of the main structure which are at sufficient distance from the arrangement of the drive elements of the flight module.

Preferably the gripper and support elements are arranged in such a way that the support points of a flight module resting on top of them are located at a smaller radial distance vis-à-vis the one central axis of the flight module on the nearest drive element, so that the drive elements of the flight module are located outside of the sphere of action of the gripper and support elements, and obstructions are avoided.

The landing of the flying vehicle or the flight module may optionally be designed so that the flying vehicle or the flight module approaches the take-off and landing station and, when a stipulated approach zone is reached, is caught by one or more gripper and support elements.

Optionally the holding apparatus and/or the gripper or support elements may be designed variable with regard to their length, i.e. extendable. Variation in length can for example be achieved through multiple segments of the holding apparatus or of the gripper or support elements being pushed into each other in the manner of a telescope. By this means an adaptation of the take-off and landing station to flying vehicles or flight modules of different geometrical design is enabled, so that different flying vehicles or flight modules can be held, fixed and/or oriented.

In one advantageous design, the holding apparatus has several elongated, column-shaped or curved pillars by means of which a receiving and holding of the flight module or flying vehicle above the site—or platform—level at such a distance can be achieved that the held flight module is located at a safe distance from a motion range of the people using or operating the flying vehicle.

Several pillars, preferably arranged distributed around the circumference of the take-off and landing station, ensure the holding apparatus is particularly stable with respect to the static and dynamic forces caused by the flying vehicle or the flight module during take-off and landing.

Preferably the length of the pillars is designed adjustable, as a result of which the held flying vehicle or the flight module—in particular when the drive units are not in operation—can be raised or lowered in relation to the level of the site or platform.

Thereby the held flying vehicle can for example be parked gently on a surface intended for its parking or raised from the surface, or the flight module can be lowered to attach it to a transportation module located beneath it or raised after disconnection from the transportation module.

To this end, the pillars may be designed capable of being extended or retracted in the manner of a telescope, so that the pillars can become lengthened or shortened in the direction of their longitudinal axis.

In accordance with one particular embodiment, the pillars and/or the gripper and support elements of the holding apparatus are designed springy.

In particular, they are designed to absorb hard landings of a flight module or flying vehicle. The suspension may for example be achieved by means of an elastic spring element, for example consisting of rubber, being integrated in the pillar or into the support element.

In one advantageous embodiment the take-off and landing station has a first section, designed for arrangement of the transportation module for attaching to and disconnecting from the flight module.

The first section is for the arrangement and storage of a transportation module in order—assigned to a flight module—to assemble a modular flying vehicle or, conversely, to uncouple a flying vehicle, wherein for this purpose the first section is firstly designed for attaching the transportation module positioned here to the flight module for the launch of the flying vehicle and secondly designed for disconnecting and storing the transportation module from the flight module after the landing of the flying vehicle.

In other words, in the first section the transportation module can be placed so fitting the position of the flight module on top of it that a coupling of these two modules can be done quickly and easily.

Likewise the gripper and support elements of the holding apparatus may be designed and arranged in such a way that the flight module can be placed so as to fit the position of the transportation module positioned in the first section.

The flight module can, after disconnection from the transportation module and the arrangement of the transportation module in the first section of the take-off and landing station, be used flexibly and in an independently mobile manner.

The first section can be so designed that several flying vehicles, flight modules and/or transportation modules can be processed in parallel and simultaneously.

The first section may, furthermore, be so designed that the transportation module is arranged at the height level of the surrounding site or the surrounding platform.

Advantageously the first section has at least one receiving device for receiving and positioning a transportation module, preferably a transportation capsule of the transportation module.

The receiving device is used for the temporary storage and positioning of the transportation module, wherein the receiving device preferably holds the transportation capsule of the transportation module, so that the transportation capsule is also capable of being handled when detached from the connecting device of the transportation module, which in particular can help save space if the connecting device is designed in the manner of a shaft and elongated.

The receiving device may for example be designed as a ring-shaped enclosure, or a bowl-shaped enclosure open at the top, of the transportation capsule, by which means the transportation capsule is held all the way round.

Preferably the shape of the receiving device corresponds to the outer shape of the particular transportation module, so that the receiving device can, at least partially, enclose the transportation module.

In other words, the receiving device can follow the outer contour of the particular transportation module or the transportation capsule and lie flush with this as far as possible.

In addition, the receiving device has a facility for centring and/or locking the received transportation module or the received transportation capsule.

By this means, secure storage, exact positioning and guiding of the transportation module or transportation capsule and its secure loading and unloading can be made possible.

In or on the receiving device, a transportation module or a transportation capsule can be stored and positioned for flight preparation and for attachment to the flight module provided, and/or, for flight follow-up, be received and stored before or after disconnection from the flight module.

Here the receiving device for receiving the transportation module can be arranged in such a way in relation to the holding apparatus for receiving the flight module that a particular operational positioning of the flight module or the flying vehicle, as needed for example in take-off mode and/or in landing mode, can be enabled.

In accordance with one advantageous embodiment, the first section has a lifting device for lifting and lowering the flying vehicle and/or the transportation module and/or the transportation capsule.

Thus for example the transportation module or the transportation capsule may, after uncoupling from the flight module and/or from the connecting device of the transportation module, be lowered to a site or platform level and/or, before the attachment of the transportation module to the flight module, be raised from a site or platform level, in order for example to ensure comfortable boarding and disembarking for the people or easier loading and unloading of the transportation module.

In accordance with a particularly advantageous embodiment, the take-off and landing station has a shielding device, designed to shield a transportation capsule located in the take-off and landing station from the flight module.

The shielding device is used to shield one or more transportation capsule(s) of the transportation module/transportation modules arranged in the take-off and landing station from the flight module or modules.

The shielding device generates a spatial separation between flight module and transportation capsule of the landed flying vehicle in the manner of an umbrella or roof structure and thereby increases the safety and security and the comfort for the people to be transported and/or for the operating staff for operation of the loads to be transported with the transportation module.

The shielding device in the manner of an umbrella or roof structure may be designed independently stationary or be attached to the holding apparatus and is preferably arranged beneath the position of the drive units/propellers of the flight module of a flying vehicle received in the take-off and landing station, but at least arranged above the first section.

The shielding device in the manner of an umbrella or roof structure may completely span the first section and possible additional sections of the take-off and landing station in part or in full.

By means of such a shielding device, the take-off and landing station can also be protected during operation of the flight module, by means of which the take-off and landing station can continue to be usable. In particular, by this means the safe, secure and comfortable loading and unloading of the transportation modules or safe and secure boarding and disembarking for passengers is enabled, as a result of which the safety and security and comfort of the take-off and landing station can be increased further.

Advantageously the shielding device has an adjustable opening, wherein the opening is designed adjustable up to its complete closure and preferably adjustable in its opening cross section. For example, the opening may be designed in the manner of an iris diaphragm. The opening can be temporarily partly or fully closed, both in the presence and absence of the flying vehicle or flying vehicles.

The opening can be opened for the take-off and landing of the flying vehicle in such a way that in particular the transportation capsule being unloaded can be fed through the adjustable opening.

When the flying vehicle has landed and when the transportation module has been disconnected, the opening can be completely closed or be partly closed in such a way that an elongated connecting device of the transportation module is closely or tightly enclosed by the closable opening, so that also when the connecting device is present, good shielding of the transportation capsule from the flight module can be achieved.

By means of the at least partially closed shielding device, the safety and security and the comfort during boarding and disembarking and/or loading and unloading of the transportation capsule can be further increased, because in particular the transportation capsule located in the first section of the take-off and landing station is sufficiently protected from the rotating drive means/propellers of the flight module located above it.

The shielding device can thereby additionally enable use specifically of the first section of the take-off and landing station also during operation of the flight module, e.g. when the propellers are rotating, so that boarding and disembarking times and/or loading and unloading times can be shortened.

The shielding device can be designed to be weatherproof and thereby act to protect the components at least of the first section of the take-off and landing station, and protect at least the people using the first section, from the effects of the weather.

The shielding device may be designed partially permeable to light, e.g. from glass.

The shielding device may advantageously have wind-deflecting fins.

The wind-deflecting fins may preferably be arranged and designed in such a way that the downdraughts generated by a flight module or flying vehicle that is taking off or landing can be diverted and deflected in a targeted manner.

The wind-deflecting fins may e.g. be designed as ring-shaped and/or curved plates pointing radially outwards, made for example from glass. The wind-deflecting fins can be arranged horizontally overlapping and arranged spaced apart from each other vertically.

In accordance with various embodiments, the take-off and landing station can have at least one additional, second section, wherein the second section is designed to store one or more transportation modules or one or more transportation capsules of the flying vehicle.

The second section is designed for storing a complete transportation module or a transportation capsule (without a connecting device), preferably for storing several transportation capsules or transportation modules.

In accordance with various embodiments, the first and second section or additional sections are directly adjacent to each other, so that the particular transportation capsules or transportation modules, after the landing or before the take-off of the flying vehicle, can be moved easily and over a short distance from the first to the second section or additional sections and vice versa. Preferably the second section can partially or fully enclose the first section.

By this means the take-off and landing station can be designed compact and space-saving, wherein free accessibility of the transportation modules or transportation capsules stored in the second section can be guaranteed, whilst the access to the first section, which is reserved for flight operations, is more easily controllable.

For comfortable, two-way access to the two areas, the first and the second area may be arranged in one plane, for example on one site or building platform level or parallel to the site or building platform level and be accessible via a common plane.

The first section and the second section may also be designed over several planes.

Several first sections may be provided, which are capable of being allocated to the second section.

The first and second section can, in accordance with various additional embodiments, be spatially separated by means of a closable separating device, e. g. a separating wall with closable opening.

Thereby the first section can only be reachable via a controllable entrance or exit.

For example, a revolving door or sliding door can be arranged in the separating device as an entrance or exit.

Hence the immediate take-off and landing section of the flight module can be secured against unauthorised or undesired access, which, in particular, helps ensure the safety of the take-off and landing station with respect to hazardous operating situations.

The separating device may for example be designed transparent or partially transparent for visual checking purposes, or for safety/security reasons, or reasons of comfort.

The take-off and landing station may have camera surveillance of the first and/or second section. By this means it can for example be ensured that take-off or landing cannot be performed until the integrity of the first section has been confirmed.

Over and above this, the take-off and landing station may have a communication facility, for example a ground control station. The communication facility can be designed for internal and/or external communication, wherein internal communication is understood to mean the communication of the ground control station with flying vehicles present in or approaching the take-off and landing station, or their modules, such as flight or transportation modules, in order for example to prepare or carry out the landings and take-offs. Internal communication may e.g. additionally comprise communication concerning free capacities, e.g. the number and nature of available transportation modules, servicing and repair requirements or the integrity of the first section for take-off and landing operations.

External communication of the ground control station relates for example to communication with air traffic control, to register the flights with them and to obtain flight clearance, or to obtain information from meteorological services. This external communication is comparable with the tower of an airport which issues permission to individual airplanes to take off or land after consulting with air traffic control.

Furthermore the take-off and landing station may have a display device which can display the status of the flight module, transportation module and/or the take-off and landing station to users or operators. By this means it is possible for example for passengers to be allocated to a particular transportation capsule and/or a particular transportation module, or waiting times can be displayed.

The take-off and landing station permits effective, comfortable and safe and secure transport logistics, as the transportation modules stored in the second section can, when required, be transferred swiftly to the first section and coupled there, with a flight module, to the flying vehicle, in order to subsequently take off. By this means there also exists the possibility of storing differently equipped transportation capsules or transportation modules, e.g. for load transportation, for transportation of people etc., in the second section, in order, when required, to swiftly access the selection of transportation capsules/transportation modules. On the other hand, there is the possibility of swiftly transferring a transportation module that has landed with the flight module in the first section to the second section, and of, if required, swapping it for another transportation module for the onward flight of the flying vehicle.

In accordance with various additional embodiments, the first section can be designed vertically adjustable with respect to the second section. In other words, the plane of the first section can for example be raised above the plane of the second section or lowered below the plane of the second section. This can for example take place by means of a lifting device of the first section and/or a lifting device of the second section.

Thereby the positioning of the transportation module and the flight module can be designed more universally in relation to each other and adjusted more easily. E.g. transportation modules of different heights can be assigned to the flight module.

In addition, to increase the flexible and rapid assignability of the transportation modules between the first and second section, there is the possibility of designing the second section horizontally movable, e.g. rotatable, with respect to the first section. This may for example be achieved by means of a displacement or rotation device of the first section and/or a displacement or rotation device of the second section.

In accordance with various additional embodiments, the take-off and landing station may have a logistics system for organising the transportation modules or the transportation capsules in the first and second section. The logistics system may permit simple and safe, secure transportation of the transportation modules or the transportation capsules from the first into the second section and vice versa, by both sections being connected to each by means of the logistics system.

For example, the logistics system may have a conveyor belt or a conveyor rail for conveying the transportation modules or the transportation capsules with or without a receiving device. For example, by means of the conveyor belt or the conveyor rail the transportation modules can be conveyed resting on or suspended along a defined conveyor line.

In order to increase safety and security, provision may be made for the logistics system to lead only through a closable opening in a spatial separation between the first and second section, which is not at the same time the closable separation device for the entry and exit of people.

Alternatively, or in addition, the logistics system can also permit transportation of the transportation modules within the second section, so that for example transportation modules that are to be loaded or unloaded can be arranged in a loading or unloading position of the second section, whilst remaining transportation modules can be arranged in a waiting position of the second section.

In accordance with additional embodiments, the logistics system may contain several receiving devices for receiving and positioning the transportation modules or transportation capsules, e. g. while they are stored in the second section and/or temporarily arranged in the first section.

The receiving devices can therefore be arranged in the first and/or second section, where preferably one receiving device can in each case be transported into and out of the first section.

The receiving devices may for example, be connected to the conveyor belt or the conveyor rail or to each other in such a way as to be capable of being engaged and disengaged, and moved in this way.

Preferably the receiving devices can also be designed rotatable in themselves i.e. about their own axis.

Specifically constructed receiving devices can be designed suitable for transportation modules for the transportation of people and/or for transportation modules for load transportation.

The receiving devices can, in addition, be designed for inductive electrical charging of an energy store of the stored transportation module.

The receiving devices located in the second section can preferably be capable of being arranged and conveyed concentrically around a central point or a central axis of the first section, i.e. the conveyor line of the receiving devices may e.g. be designed in the form of a circle or corresponding to the contour of a polygon, wherein the contour of the circle or the polygon is arranged symmetrically around a common centre with the central point or the central axis of the first section.

Combining the different embodiments, precise and efficient logistics of the transportation modules both among themselves and when assigning the transportation modules to the flight module, and when loading and unloading the transportation modules, can be achieved, which simplifies the handling processes in the take-off and landing station and makes them safer and more secure.

In accordance with additional embodiments, the take-off and landing station may have one or more charging modules.

The charging module may electrically charge a flying vehicle, in particular a transportation module and/or a flight module.

Each charging module may have one or more rechargeable energy stores, e.g. in the form of rechargeable batteries or supercapacitors, a charging device and/or solar cells. The rechargeable energy stores may be arranged in and/or on the take-off and landing station, whilst the solar cells may be attached to the outer surface of the take-off and landing station, for example on the shielding device.

By means of the gripper or support elements of the holding apparatus, the flying vehicle or the flight module can be so oriented that a connection to a charging device of the charging module, for supplying energy to the flight module, is enabled.

The charging device may be designed for transferring electrical energy from an external energy supply network to the energy store(s), for example with the aid of a couplable/pluggable electrical connection.

The charging device may be arranged on the holding apparatus or on the shielding device.

The energy stores may be designed to store the transferred electrical energy, and/or electrical energy self-generated by means of the solar cells, and for supplying energy to the take-off and landing station and/or a received transportation module, flight module or flying vehicle.

By this means the take-off and landing station may be designed self-sufficient in energy terms, since the energy supply to the take-off and landing station and the modules to be processed (transportation modules, flight modules) can occur within the take-off and landing station and temporarily independently of the external energy supply.

Preferably the charging module is designed for inductive charging of the energy stores, so that there is no longer any need for a cable connection.

Preferably the charging module may be designed for charging a rechargeable energy store of the flight module and/or for charging rechargeable energy stores of one or more transportation modules.

Several charging modules can electrically charge, in parallel, several flying vehicles, in particular several transportation modules and/or flight modules, whereby the time that the flying vehicle or vehicles must remain or wait can be minimised and thereby the efficiency of the take-off and landing station can be increased.

BRIEF DESCRIPTION OF THE DRAWINGS

Other benefits of the present invention are apparent from the drawings and from the associated description. They show the following.

DETAILED DESCRIPTION OF EMBODIMENTS OF THE INVENTION

In the examples explained in more detail below, reference is made to the attached drawings, which form part of the examples and in which, by way of visualisation, specific embodiments are shown in which the invention can be executed. In this respect, direction terminology such as "above", "below", "at the front", "at the rear", "front", "rear" etc. are used with reference to the orientation of the Figures described. Since components of embodiments can be positioned in a number of different orientations, the direction terminology is by way of visualisation and is in no way restrictive.

It goes without saying that other embodiments can be used and structural or logical changes can be performed without deviating from the scope of protection of the present invention. It goes without saying that the features of the various exemplary embodiments described herein can be combined with one another unless something specifically to the contrary is stated. The following detailed description is therefore not to be understood in a restrictive sense, and the scope of protection of the present invention is defined by the attached claims.

Within the context of this description, the terms "connected", "attached" and "coupled" are used to describe both a direct and an indirect connection, a direct or indirect attachment and a direct or indirect coupling. In the Figures, identical or similar elements are given identical reference symbols, insofar as this is appropriate.

Figure 1:
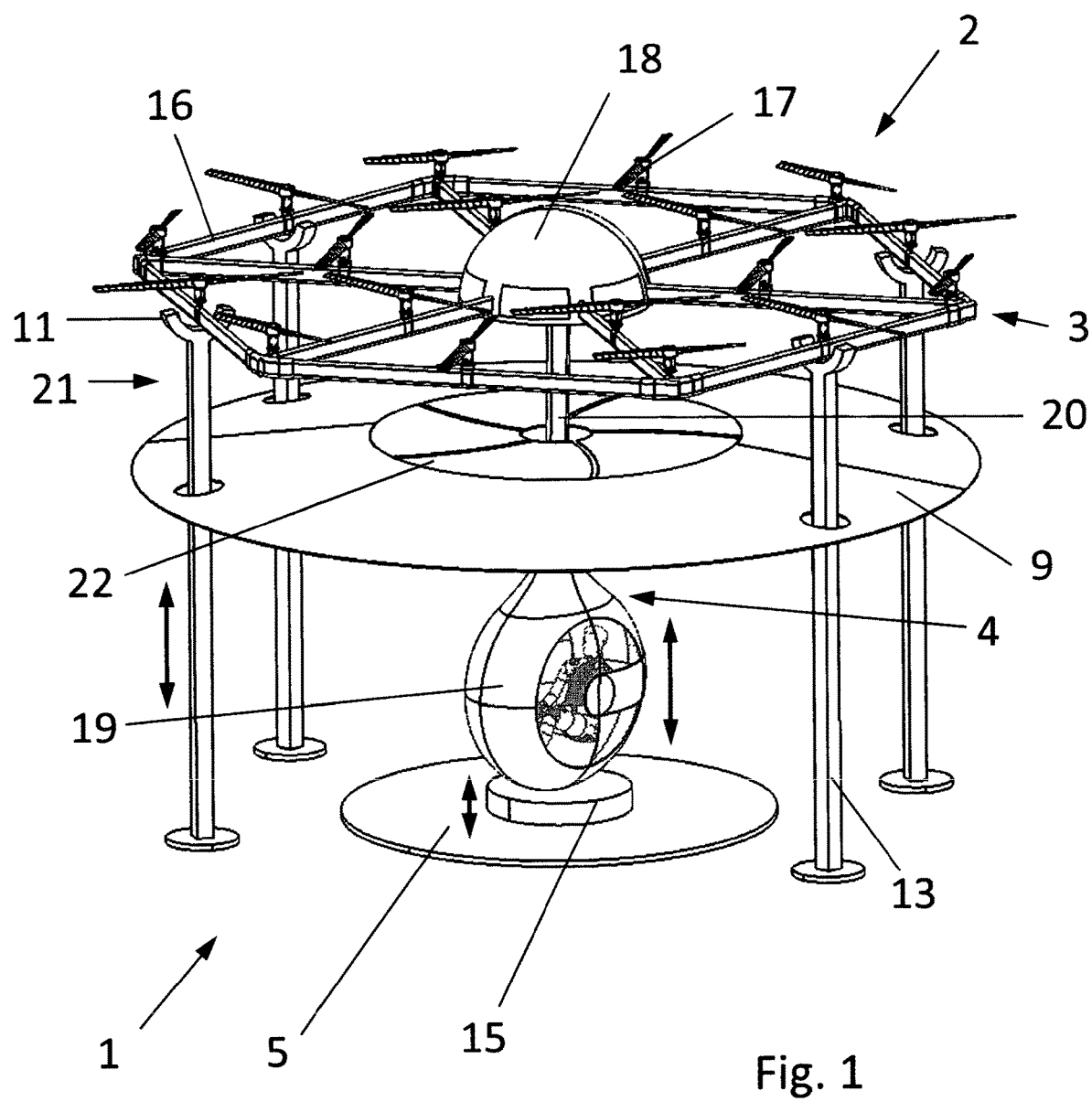
FIG. 1 exemplary illustration of a take-off and landing station with flying vehicle.

FIG. 1 shows a take-off and landing station 1 with a flying vehicle 2 arranged therein which takes off and lands vertically.

The flying vehicle 2 arranged in the take-off and landing station 1 has a flight module 3 and a transportation module 4 coupled to flight module 3.

The take-off and landing station 1 has a first, inner section 5, which is schematically represented in FIG. 1 in the form of a circle. The first, inner section is designed for the take-off and landing of flying vehicle 2. In the section the transportation module 4 is arranged for attachment to or disconnection from the flight module 3, for the boarding and disembarking of people or for loading and unloading loads.

The transportation module 4 has a teardrop-shaped transportation capsule 19 and a detachable connecting device 20. The connecting device 20 comprises an elongated shaft and a coupling device, in order to connect the transportation capsule 19 at a safe distance to the flight module 3.

The flight module 3 has several drive units 17 arranged on a main structure 16 in one plane, wherein each drive unit 17 can have an electric motor and a propeller that has an operative connection to the electric motor. At the centre of the flight module 3 a central unit 18 with a coupling device is present to which the transportation module 4 can be attached.

The take-off and landing station 1 also comprises a holding apparatus 21 for holding the flight module 3 during take-off and landing of the flying vehicle 2. The holding apparatus 21 has four pillars 13, which are arranged around the first, inner section 5 of the take-off and landing station and are anchored in the ground below the site. At the upper end of each of the pillars 13, a fork-shaped gripper and support element 11 is arranged.

By means of the four gripper and support elements 11 of the holding apparatus 21, the flight module 3 can—with or without attached transportation module 4—be held, positioned and fixed on its main structure 16. A different number of pillars 13 and gripper and support elements 11 may also be provided.

The gripper and support elements 11 are rubber-coated and designed inherently springy in order to absorb hard landings when the flying vehicle 2 or the flight module lands. The main structure 16 of the flight module 3 lies on the support element 11.

The flight module 3, when the flying vehicle 2 is not in operation, lies with the underside of the main structure 16 on the fork-shaped support elements 11 that are open at the top, so that these are at a sufficient distance from the drive elements 17 of the flight module 3.

The pillars 13 are designed adjustable in length (indicated by the inverted/change directed arrows), whereby the flying vehicle 2 held by the gripper and support arms 11 is raised by a platform 15 of the first section 5 or can be lowered onto the platform 15. Integrated into platform 15 of the first section is a vertically adjustable lifting device 15 (indicated by the inverted arrows), in order to be able to lift or lower the flying vehicle or the uncoupled transportation module 4 or only the transportation capsule 19 and, in particular, to be able to position the transportation module 4 for attachment or disconnection in relation to flight module 3.

Furthermore, the take-off and landing station has a shielding device 9 which for example as shown in FIG. 1 may be constructed in the manner of an umbrella, flat or slightly curved and circularly limited, and covers at least the first section 5. The shielding device 9 may be designed self-supporting or, as provided for in the example in accordance with FIG. 1, attached to the holding apparatus 21.

The shielding device 9 has a closable opening 22 arranged centrally above the first section 5 that takes the form of an iris diaphragm, which in the presence of the flying vehicle 1 or a transportation module 4 in the first, inner section 5 may be partially closed by the connecting device 20 of the transportation module 4 surrounding it, and in the absence of the flying vehicle 1 or a transportation module 4 or a connecting device 20 of the transportation module 4 can be completed closed. I.e. even in the presence of just one flight module 3, which is held above the first, inner section 5 of the holding device 21, the opening 22 can be completely closed.

The first, inner section can have devices for supplying electricity to the take-off and landing station 1, optionally for supplying electricity to an integrated charging module and optionally for directly or indirectly supplying electricity to the flying vehicle 2 or its modules (flight module 3, transportation module 4).

In addition, a communication device for internal and external communication may be provided. In addition, a monitoring device may be present by means of which at least the inner section 5 can be monitored, so that a take-off or landing cannot be performed until the integrity of the inner section 5 has been confirmed.

In addition, the first section 5 may have a mechanical and/or electronic system for orienting and/or guiding the flight module 3 or flying vehicle 2 during take-off and landing.

Figure 2:
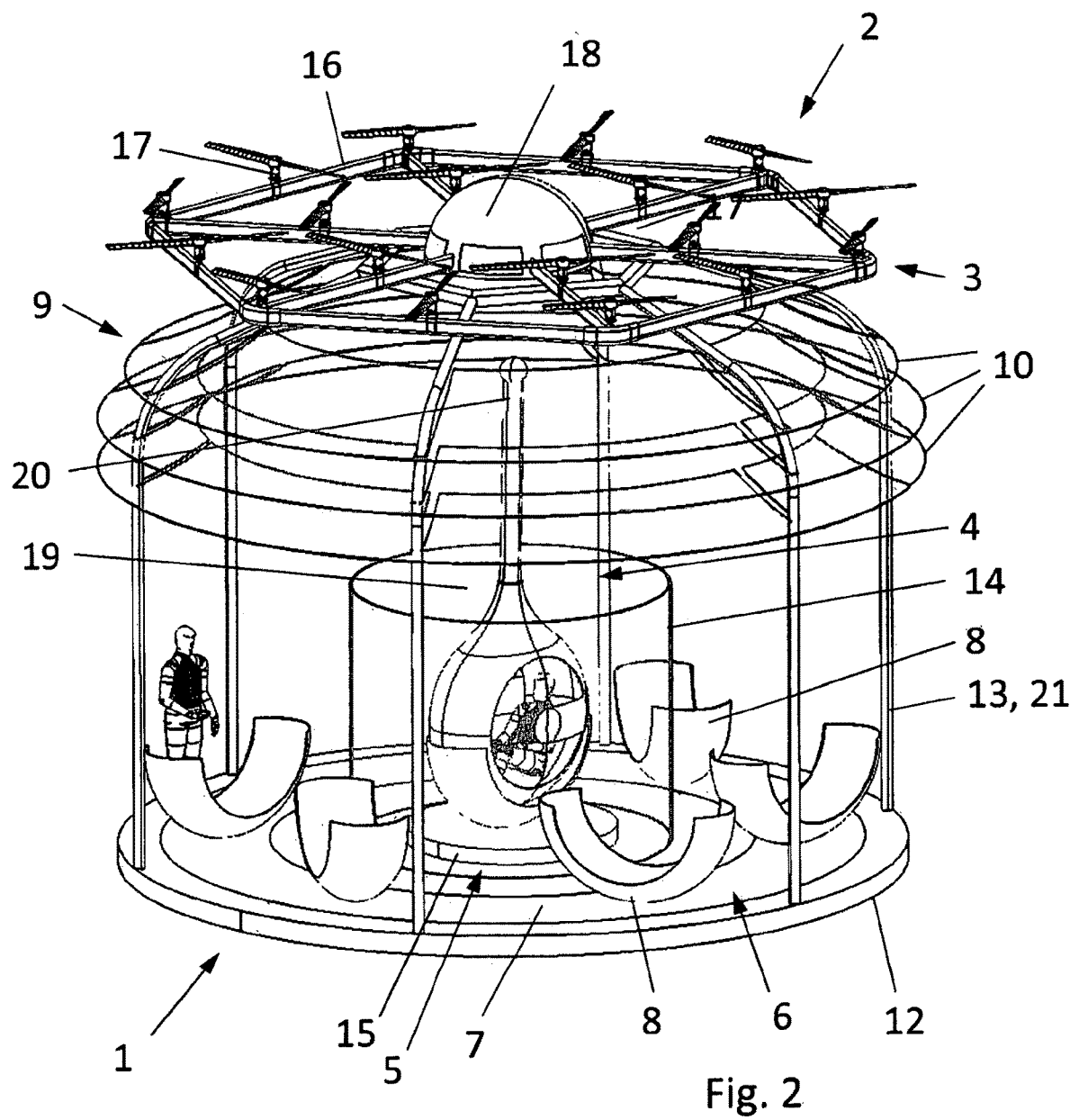
FIG. 2 exemplary illustration of another take-off and landing station with flying vehicle.

FIG. 2 shows a further embodiment of the take-off and landing station 1 with a flying vehicle 2 that takes off and lands vertically, which has a flight module 3 and a transportation module 4 coupled to the flight module 3.

Figure 3:
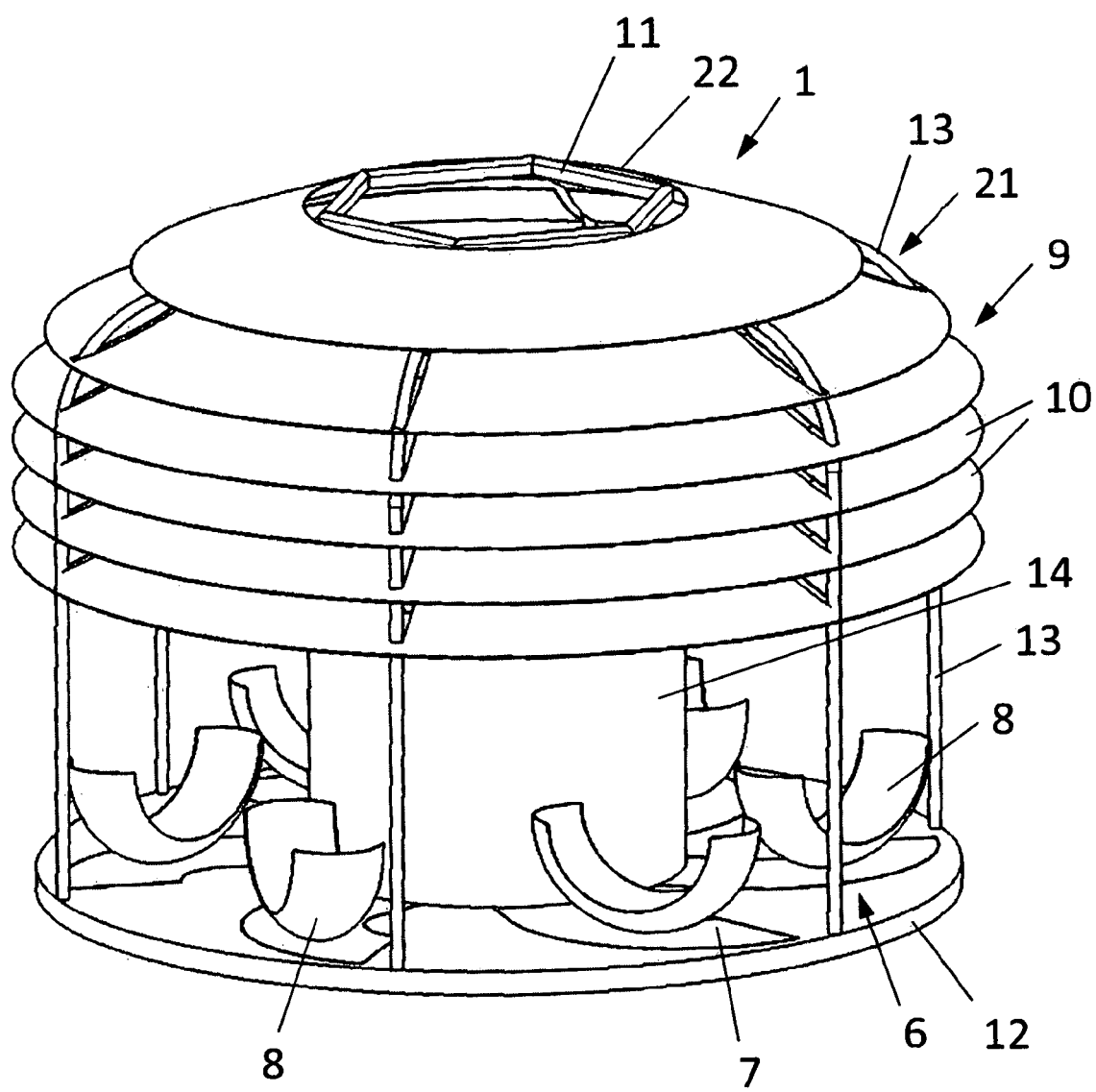
FIG. 3 schematic illustration of the side view of a take-off and landing station.
Figure 4:
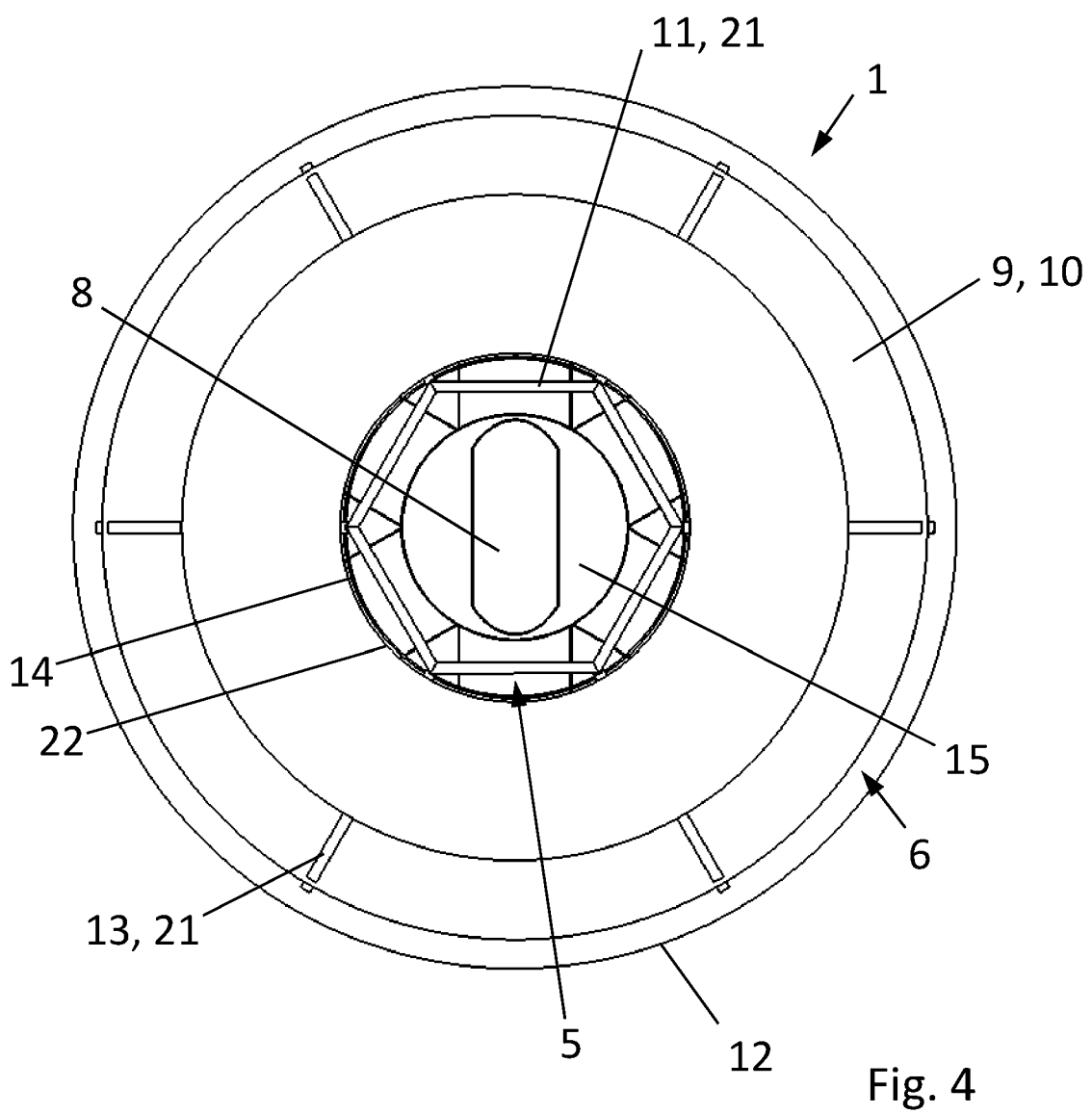
FIG. 4 schematic illustration of the plan view of a take-off and landing station.

FIGS. 3 and 4 show schematically and in different views the take-off and landing station 1 depicted in FIG. 2.

Below, only the differences from the design of the take-off and landing station 1 in accordance with FIG. 1 are described.

The take-off and landing station 1 in accordance with FIG. 2 has, in addition to the first, inner section 5, a second, outer section 6 which encloses the first section 5 completely and in a circular manner. The second section 6 is designed for storing a plurality of transportation modules 4 (not shown). Thereby the first section 5 of the take-off and landing station 1 in accordance with FIG. 2 is designed, by way of an expansion of functions, for the temporary arrangement of a transportation module 4 with regard to flight module 3.

In constructional terms, the second section of the take-off and landing station 1 in accordance with FIG. 2 comprises a base slab 12 on which the pillars 13 of the holding apparatus 21 are arranged. The pillars 13 are designed curved in order to support a shielding device 9 designed as a roof structure which covers the first and second section 5, 6. The roof structure 9 has wind-deflecting fins 10, which in the embodiment are designed as glass plates circular in shape that curve outwards, in order to keep at bay the downdraught of the drive units 17 of the flight module 3 and weathering effects.

An upper edge of the closable opening 22 in the shielding device 9 above the first section 5 is lined with several beam-shaped, hexagonally arranged support elements 11 that are connected to each other (for more details see FIGS. 3 and 4). The beam-shaped elements 11 are designed rubber-coated and springy, in order to absorb hard landings of the flight module 3 during landing. When the flying vehicle 2 is at a standstill, the underside of the main structure 16 of the flight module 3 lies on top of the beam-shaped support elements 11, whereby these are at a sufficient distance from the drive elements 17 of the flight module 3.

The base slab 12 may have the facilities for supplying electricity to the take-off and landing station 1, optionally for supplying electricity to an integrated charging module and also optionally for directly or indirectly supplying electricity to the flying vehicle 2 and/or its modules (flight module 3, transportation module 4).

In addition, the technical facilities for the communication device and the monitoring device may be provided in the base slab 12.

The first and second sections 5, 6 are spatially separated from each other by means of a separating device 14. The separating device 14 is, in the embodiment, designed as a glass wall which has a closable entry or exit to the inner section 5. By contrast, the second section 6 is freely accessible from outside.

The first and second sections 5, 6 contain a logistics system 7, which comprises one or more conveyor belts and several shell-shaped receiving devices 8 (holding shells 8), which can be moved by means of the conveyor belts.

The holding shells 8 of the logistics system 7 are provided for receiving and positioning the transportation module 4 and additional transportation modules that are not shown.

The holding shells 8 and the received transportation modules 4 can be moved using the conveyor belt of the logistics system 7 via differently constructed conveyor lines (FIGS. 2, 3) within the second section 6 or from the first section 5 into the second section 6 or vice versa.

In the first section 5 a holding shell 8 can be temporarily arranged for receiving and positioning the transportation capsule 19 of the transportation module 4 of the flying vehicle 2—taking off or landing—that is to be attached or disconnected, wherein this holding shell 8 is positioned centrally in relation to the first section and to the flying vehicle 2. By contrast, in the second section 6 several holding shells 8 are arranged moveable concentrically around the first section 5, which aid the storage of transportation modules 4 (not shown) that are temporarily not needed.

The shape of the holding shells 8 largely follows the outer contour of the lower section of the transportation capsule 19 of the transportation module 4, wherein these partially enclose the transportation capsule 19.

In addition, the holding shells 8 have a device for inductive charging of the transportation modules 4.

The take-off and landing station 1, as for example described above in reference to FIGS. 2 to 4, can be handled as described below together with the modular flying vehicle 2.

Fundamentally it is envisaged that either a flying vehicle 2, i.e. a flight module 3 with attached transportation module 4, or a flight module 3 alone, takes or lands. During the take-off and landing process, the flight module 3 may use an orientation and/or control system of the take-off and landing station 1, so that a precise descent or ascent can be achieved with the necessary positioning of flight module 3 or flying vehicle 2 with respect to the take-off and landing station 1.

Before the take-off and landing, the flight module 3 is lying with its main structure 16 on the beam-shaped support elements 11. The connection of flight module 3 and transportation module 4 can advantageously take place in a load-free state. To this end, the transportation module 4 can be positioned by means of the vertically adjustable platform 15 relative to the flight module 3 resting on the beam-shaped support elements 11.

Before the coupling of the flight module 3 to the transportation module 4, the logistics system 7 of the take-off and landing station 1 positions a holding shell 8 with a transportation module 4 within the first section 5, in order e.g. to enable boarding or disembarking or loading or unloading of the transportation module 4 and to produce the precise position for coupling to the flight module 3.

The boarding or disembarking or the loading or unloading of transportation module 4 can however also take place outside of the first section 5 during the positioning of the transportation module 4 by means of the logistics system 7 in the second section 6.

After the coupling of the flight module 3 to the transportation module 4, the take-off together with flight module 3 is prepared and performed.

Whilst the coupling process can still take place with the opening 22 largely closed, the opening 22 is opened for take-off and landing of flying vehicle 2.

The take-off and landing of the flying vehicle 2 are preferably only possible if no unauthorised persons, e.g. passengers or ground staff, animals or loose objects, e.g. spare parts, components, tools etc., are located in the first section 5 separated by the closed glass wall 14. By this means, the spinning or flinging around of objects can be prevented, so that safety in the take-off and landing station is increased.

During the take-off of the flying vehicle 2, a further transportation module 4 can already be organised from the second section 6 for handover to the first section 5, in order, after the landing of a further flying vehicle 2 or of a flight module 3 has taken place, to prepare the next coupling and take-off process in the first section 5.

The transportation module 4 and the take-off and landing station 1 can communicate with each other by means of a communications device designed for internal system communication.

For example, a status report from the transportation module 4 about a loading and/or boarding status can be exchanged. Furthermore, the transportation module 4 can communicate a status report about the attainment of a safety or security status, so that a positioning can be initiated by means of the logistics system 7. The take-off and landing station 1 can communicate a status report about the attainment of a final position of flying vehicle 2 or of transportation module 4, in order e.g. to give clearance for boarding and disembarking for passengers.

Similarly, provision can be made for flight module 3 and the take-off and landing station 1 to also communicate with each other via a communication device designed for internal system communication. For example, a status report on the final, fixed position of transportation module 4 may be passed to the flight module 3 in order to signal the possibility of attaching to or disconnecting from the flight module 3.

A further status report may be made by the flight module 3 regarding the completed attachment or disconnection of the transportation module 4, in order to signal readiness for take-off or completion of the landing process.

A further status report can be issued by the flight module 3 regarding the successful landing on the support elements 11 of the holding apparatus 21 x and/or about the attainment of a final position of the flying vehicle 2 or the flight module 3 in the take-off and landing station 1, in order e.g. to give clearance for boarding or disembarking of passengers or loading or unloading of the payload.

A further status report may report the integrity of the first section 5 and/or of the loading status, e.g. weight, locking, securing etc., of the transportation module 4, so that a take-off or landing process can be initiated safely.

The expression "and/or" used here, when used in a series of two or more elements, means that each of the listed elements can be used alone, or any combination of two or more of the listed elements can be used.

If for example a relationship is described which contains the components A, B and/or C, the relationship may contain the components A alone; B alone; C alone; A and B in combination; A and C in combination; B and C in combination; or A, B, and C in combination.

LIST OF REFERENCE NUMERALS

1 Take-off and landing station
2 Flying vehicle
3 Flight module
4 Transportation module
5 First section
6 Second section
7 Logistics system 8 Receiving device, holding shell
9 Shielding device
10 Wind-deflecting fins
11 Support element, fork-shaped, beam-shaped
12 Base slab
13 Column, pillars, column-shaped, arched
14 Separating device
15 Vertically adjustable platform
16 Main structure
17 Drive unit
18 Central unit
19 Transportation capsule
20 Connecting device
21 Holding apparatus
22 Closable opening

The invention claimed is:

1. A take-off and landing station for a flying vehicle which takes off and lands vertically for transporting people and/or loads, wherein the station comprises (i) a flight module having several drive units arranged on a supporting framework structure of the flight module, (ii) a transportation module that can be coupled to the flight module, and (iii) a holding apparatus comprising several gripper or support elements for supporting, fixing and/or orienting the supporting framework structure during take-off and landing of the flying vehicle or the flight module.

2. The take-off and landing station of claim 1, wherein the holding apparatus comprises several column-shaped or arched pillars.

3. The take-off and landing station of claim 2, wherein the pillars have an adjustable length.

4. The take-off and landing station of claim 2, wherein the pillars and/or the gripper and support elements are designed as springs.

5. The take-off and landing station of claim 1, wherein the station comprises a first section constructed for arranging the transportation module for attachment to and disconnection from the flight module.

6. The take-off and landing station of claim 5, wherein the first section comprises at least one receiving device for receiving and positioning a transportation module.

7. The take-off and landing station of claim 5, wherein the first section comprises a lifting device for lifting and lowering the flying vehicle and/or the transportation module and/or a transportation capsule of the transportation module.

8. The take-off and landing station of claim 1, wherein the station further comprises a shielding device for shielding a transportation capsule located in the station from the flight module.

9. The take-off and landing station of claim 8, wherein the shielding device has an adjustable opening.

10. The take-off and landing station of claim 8, wherein the shielding device comprises wind-deflecting fins.

11. The take-off and landing station of claim 5, wherein the station further comprises a second section designed for storing one or more transportation modules and/or one or more transportation capsules.

12. The take-off and landing station of claim 11, wherein the first and second sections are directly adjacent to each other.

13. The take-off and landing station of claim 12, wherein the second section partially or fully encloses the first section.

14. The take-off and landing station of claim 11, wherein the first section can be separated from the second section by a closable separating device.

15. The take-off and landing station of claim 11, wherein the first section is vertically adjustable with respect to the second section and/or the second section is horizontally adjustable with respect to the first section.

16. The take-off and landing station of claim 11, wherein the station further comprises a logistics system for organizing transportation modules and/or transportation capsules in the first and second sections.

17. The take-off and landing station of claim 16, wherein the logistics system comprises a conveyor belt or a conveyor rail for transporting the transportation modules or transportation capsules.

18. The take-off and landing station of claim 16, wherein the logistics system comprises several receiving devices for receiving and positioning transportation modules and/or transportation capsules.

19. The take-off and landing station of claim 18, wherein the receiving devices in the second section are capable of being arranged and conveyed concentrically around a central point or a central axis of the first section and/or being transported between the first section and the second section.

20. The take-off and landing station of claim 1, wherein the station further comprises one or more charging modules.

* * * * *